US008548303B2

(12) United States Patent
Grevers, Jr.

(10) Patent No.: US 8,548,303 B2
(45) Date of Patent: Oct. 1, 2013

(54) RECONCILING DIGITAL CONTENT AT A DIGITAL MEDIA DEVICE

(75) Inventor: Theodore Grevers, Jr., Milford, MA (US)

(73) Assignee: Cisco Technology, Inc., San Jose, CA (US)

(*) Notice: Subject to any disclaimer, the term of this patent is extended or adjusted under 35 U.S.C. 154(b) by 139 days.

(21) Appl. No.: 12/925,973

(22) Filed: Nov. 3, 2010

(65) Prior Publication Data

US 2012/0106932 A1     May 3, 2012

(51) Int. Cl.
*H04N 5/76* (2006.01)
*G06F 15/16* (2006.01)

(52) U.S. Cl.
USPC ............................................... 386/292

(58) Field of Classification Search
None
See application file for complete search history.

(56) References Cited

U.S. PATENT DOCUMENTS

| 2006/0263046 A1* | 11/2006 | Saito ................................. 386/83 |
| 2007/0009235 A1* | 1/2007 | Walters et al. ................. 386/112 |
| 2008/0086743 A1* | 4/2008 | Cheng et al. ..................... 725/38 |
| 2009/0028520 A1 | 1/2009 | Jain et al. |
| 2009/0150715 A1 | 6/2009 | Pickens et al. |
| 2009/0150960 A1 | 6/2009 | Pickens et al. |
| 2010/0111504 A1* | 5/2010 | Yu et al. ......................... 386/124 |
| 2011/0311204 A1* | 12/2011 | Adimatyam et al. ............ 386/295 |

* cited by examiner

*Primary Examiner* — Thai Tran
*Assistant Examiner* — Sunghyoun Park
(74) *Attorney, Agent, or Firm* — Cindy Kaplan

(57) ABSTRACT

In one embodiment, a method includes initiating recording a program at a digital media device, identifying at the digital media device, a missing portion of the program, generating and transmitting a request for the missing portion, receiving a media file containing the missing portion of the program in response to the request, and merging the missing portion with a recorded portion of the program. An apparatus is also disclosed.

18 Claims, 6 Drawing Sheets

RECONCILING DIGITAL CONTENT AT A DIGITAL MEDIA DEVICE

TECHNICAL FIELD

The present disclosure relates generally to the field of digital media, and more specifically, to recording digital media.

BACKGROUND

Digital media devices, such as digital video recorders (DVRs) are increasing in popularity. Digital video recorders are often associated with a service that allows users to automatically record programs, such as television shows or other content. Programs may be pre-selected for recording or manually selected by a user. If the user selects a program for recording after the program has already started, only a portion of the program may be available for recording.

BRIEF DESCRIPTION OF THE DRAWINGS

Corresponding reference characters indicate corresponding parts throughout the several views of the drawings.

DESCRIPTION OF EXAMPLE EMBODIMENTS

Overview

In one embodiment, a method generally comprises initiating recording a program at a digital media device, identifying at the digital media device, a missing portion of the program, generating and transmitting a request for the missing portion, receiving a media file containing the missing portion of the program in response to the request, and merging the missing portion with a recorded portion of the program.

In another embodiment, an apparatus generally comprises a digital video recorder operable to initiate recording a program, a program identifier for identifying a missing portion of the program, a content requester for generating and transmitting a request for the missing portion of the program, and a content merger for receiving a media file containing the missing portion of the program and merging the missing portion with a recorded portion of the program.

Example Embodiments

The following description is presented to enable one of ordinary skill in the art to make and use the embodiments. Descriptions of specific embodiments and applications are provided only as examples and various modifications will be readily apparent to those skilled in the art. The general principles described herein may be applied to other applications without departing from the scope of the embodiments. Thus, the embodiments are not to be limited to those shown, but are to be accorded the widest scope consistent with the principles and features described herein. For purpose of clarity, features relating to technical material that is known in the technical fields related to the embodiments have not been described in detail.

Digital video recorders (DVRs) are often used with a service that allows users to pre-select programs to record. Users may also manually activate the recorder to record a program. Manual recording of a program is often initiated after the program has started. For example, the user may decide to record a program after switching to a program already in progress or after watching a portion of the program. In some cases, the user may realize after the program has started that he forgot to set the recorder to record the program. If the program started before the user activated the recorder, at least a portion of the program is typically no longer available for recording and the stored copy of the program is incomplete.

Embodiments described herein provide a method and apparatus for identifying a missed portion of the program, obtaining a copy of the missed portion, and combining the missed portion with the recorded portion of the program to create one contiguous recording. The incomplete recorded program is reconciled to recover any missing content and provide a complete recording of the program.

Figure 1:
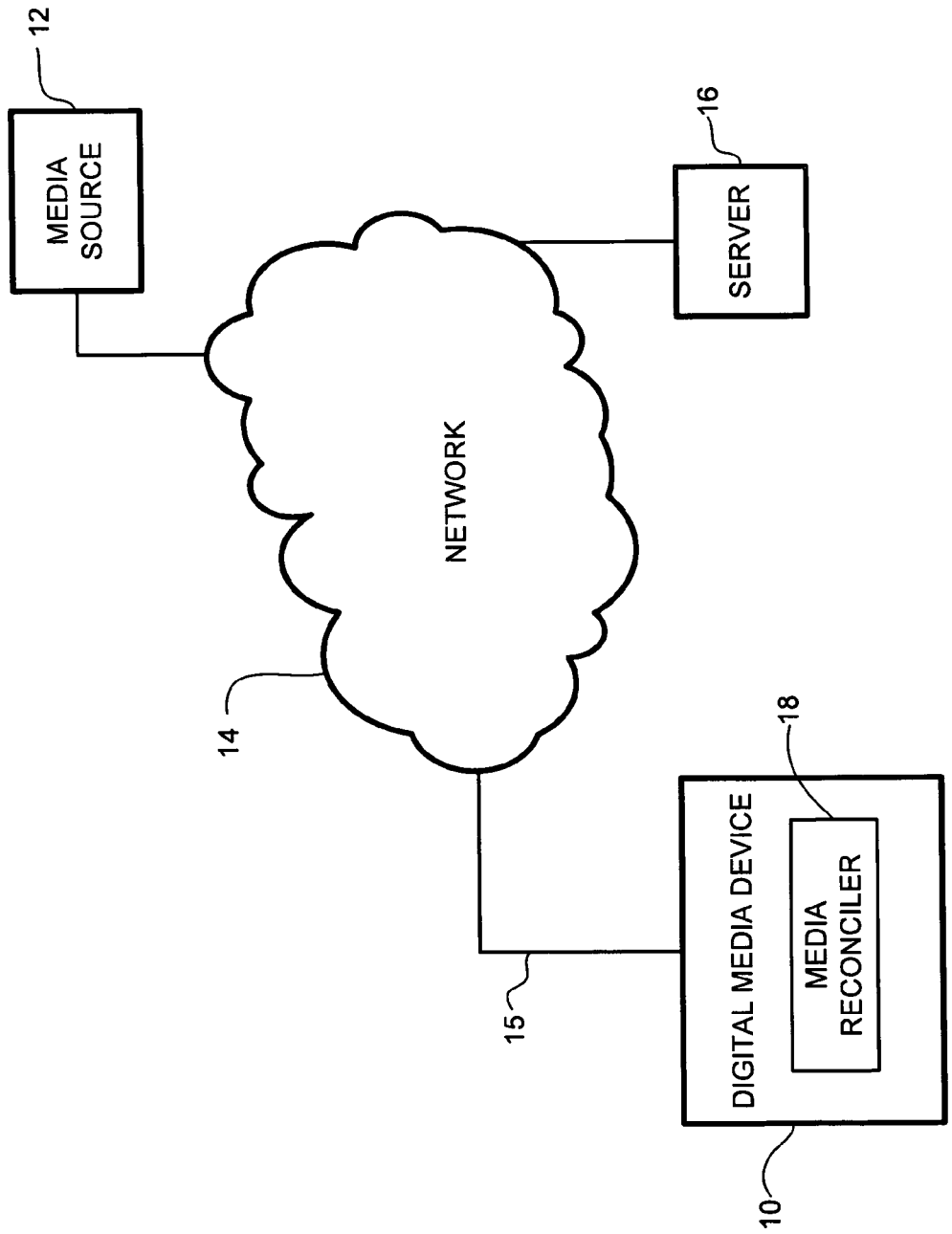
FIG. 1 illustrates an example of a network in which embodiments described herein may be implemented.

Referring now to the drawings, and first to FIG. 1, a network in which embodiments described herein may be implemented is shown. A digital media device 10 receives digital media content from a media source 12 or server 16 via network 14. It is to be understood that the example shown in FIG. 1 is a simplified schematic and that the network may comprise any number of digital media devices, media sources, servers, or network devices, without departing from the scope of the embodiments.

Digital media content delivered by the media source 12 and server 16 may be audio, video, data or any combination thereof. In one embodiment, the media source 12 transmits streaming media to the digital media device 10 and the server 16 transmits media files recorded from the streaming media, to the digital media device. Digital media content transmitted to the digital media device 10 may be encoded. For example, the media content may be encoded based on an encoding format such as MPEG-2 (Moving Picture Experts Group-2), MPEG2-TS (Transport Stream), H.264/MPEG-4 AVC (Advanced Video Coding), SMPTE (Society of Motion Picture and Television Engineers) VC-1 (Video Codec-1), or any other format. Media content delivered from the media source 12 within a specified window is referred to herein as a program. A copy of the program is stored at the server 16 so that a missing portion of a recorded program can be downloaded by the digital media device 10, as described further below. In the example shown in FIG. 1 and described below, the media source 12 and server 16 are independent sources of media content. It is to be understood that the media source 12 and server 16 may also be combined or co-located so that the media stream and requested content are provided from the same source.

The media source 12 delivers various video, audio, and data, including, for example, television shows, video-on-demand, pay-per-view, music, or other content or services to subscribers. The media source 12 may be a component within a cable television network, television services network, broadcast television station, or a content delivery network, for example.

The server 16 may be a start over server, a node comprising a network cache in a content delivery network, or any other network device operable to store and transmit digital media. For example, the server 16 may be configured to actively cache linear programs in support of a start over service referred to as 'live to file capture'. The server 16 may be part of a content delivery system, which stores streaming media as it is delivered from media source 12. In one example, the server 16 records program content to a media file as it is received from the media source 12. The content may be stored temporarily (e.g., until the program is finished, a specified time after the program is finished, or a fixed period of time). The stored content is available for delivery to the digital media device 10 upon receiving a request for missing content, as described further below with respect to FIGS. 4, 5, and 6.

Digital media from the media source 12 and server 16 is transmitted over the network 14 to the digital media device 10 at a subscriber connection 15. The network 14 may comprise one or more networks, including, for example, a local area network (LAN), wide area network (WAN), wireless LAN (WLAN), cable network, satellite network, content delivery network (CDN), etc., or any combination thereof. The content delivery network may include multiple nodes (e.g., server 16) for delivering content to the digital media device 10. The CDN may also include one or more peer-to-peer connections for delivering content to the digital media device 10.

The digital media device 10 may comprise, for example, a digital video recorder or any other device operable to receive and record digital data, such as a set-top box, residential gateway, personal computer, mobile device (e.g., phone, personal digital assistant, digital media player), media center device, and the like. As described in detail below, the digital media device 10 includes a media reconciler 18 for creating a complete program in the case where a recording is started after a program has already begun. The digital media device 10 may receive user input from an input device (e.g., keyboard, remote control) or directly from a user (e.g., buttons on a user interface on the exterior of the digital media device). Content stored in the digital media device 10 may be displayed on a display device (e.g., television, monitor, display screen) either integrated with the digital media device or in communication with the digital media device.

Figure 2:
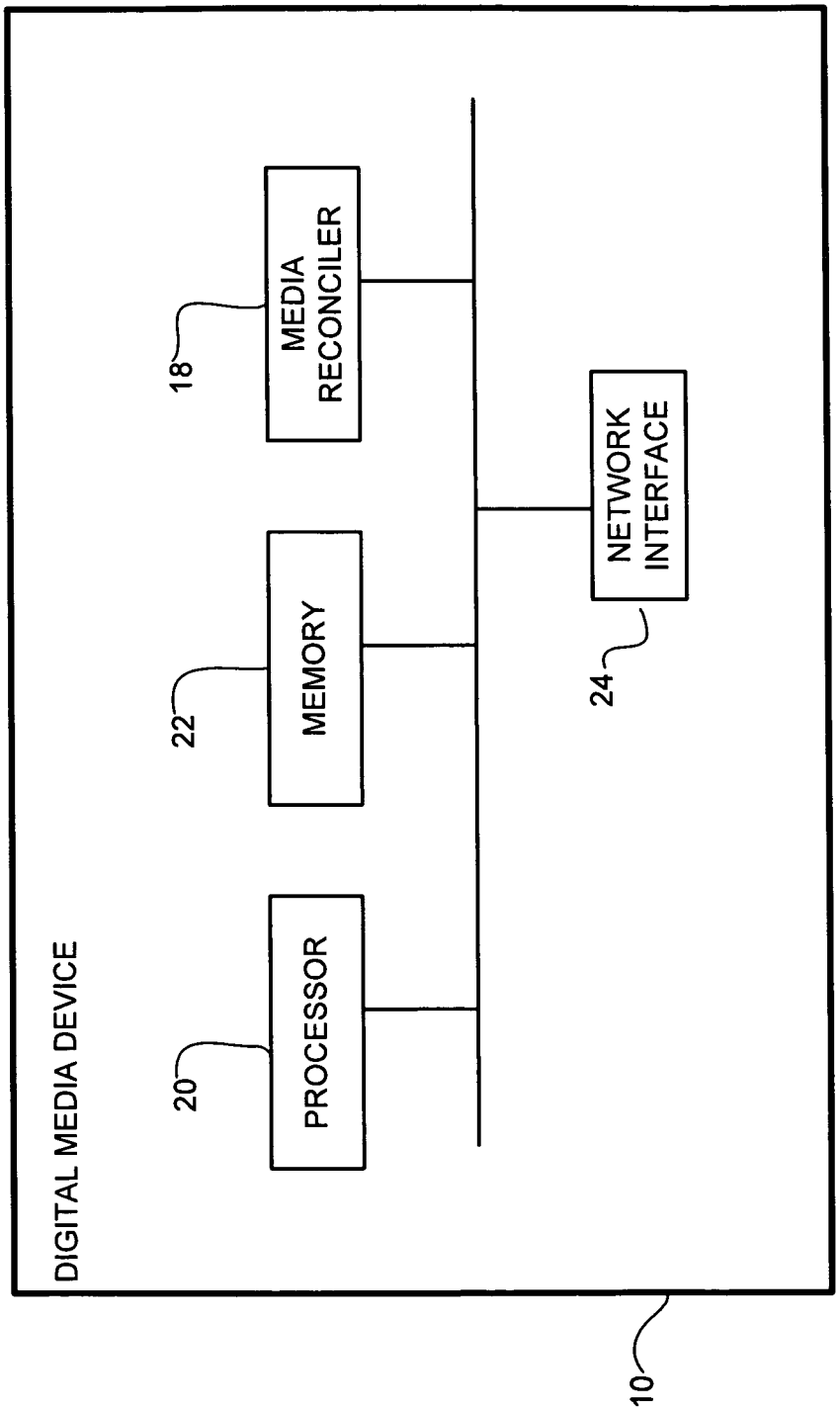
FIG. 2 illustrates an example of a digital media device for use in the network of FIG. 1.

FIG. 2 is a block diagram illustrating an example of the digital media device 10. The device 10 includes the media reconciler 18, one or more processors 20, memory 22, and one or more network interfaces 24. The recorded digital media is stored in memory 22. The digital media device 10 may also record the content and store or distribute it among other storage devices. Memory 20 may be a volatile memory or non-volatile storage such as a CD (compact disk), DVD (digital video disk), hard disk, flash memory (e.g., USB (universal serial bus) flash drive), SD (secure digital) memory card, etc. Memory 22 also stores various applications, modules, and data for execution and use by the processor 20.

The processor 20 controls operation of the digital media device 10 and may provide for functions such as decoding, encoding, transcoding/encoding (converting from one format to another), decryption, encryption, etc. The processor 20 also provides for recording operations and functions associated with the media reconciler 18, as described below. Logic may be encoded in one or more tangible media for execution by the processor 20. For example, the processor 20 may execute codes stored in a computer-readable medium such as memory 22. The computer-readable medium may be, for example, electronic (e.g., RAM (random access memory), ROM (read-only memory), EPROM (erasable programmable read-only memory)), magnetic, optical (e.g., CD, DVD), electromagnetic, semiconductor technology, or any other suitable medium.

The interface 24 may comprise one or more wireless or wired interfaces (or ports) for receiving signals or data or transmitting signals or data to other devices. The interfaces may include, for example, a USB, Ethernet port (for connection to a computer or network), or a serial port. Wireless interfaces include, for example IEEE 802.11 (Wi-Fi), IEEE 806.16 (WiMax), Bluetooth, etc.

The digital media device 10 may comprise a digital video recorder interposed between a receiver/tuner (e.g., set-top box) and a display (e.g., television) or the digital media device may comprise a device such as a set-top box which incorporates the digital video recording functions. The digital media device 10 may therefore include a receiver and tuner or these components may be incorporated in a separate device in communication with the digital video recorder.

The receiver receives via the subscriber connection 15, programs that correspond to the services selected by a user. The receiver then selects one or more of the delivered services for presentation to a user or recorder. This selection is sometimes referred to as 'tuning'. The media streams corresponding to the program of the selected service may be processed and converted into a presentable output form, such as a video signal, either in analog or digital form. Processing may include decompression and reconstruction of the pictures in a received media stream. The video signal may then be supplied to the display for viewing by the subscriber.

The digital media device 10 may also include an electronic program guide (EPG) which is displayed on the display screen. As described below, the electronic program guide also provides program information which may be used to identify missing content at the digital media device 10.

It is to be understood that the digital media device 10 shown in FIG. 2 and described above is only one example and that different configurations of digital media devices may be used, without departing from the scope of the embodiments.

Figure 3:
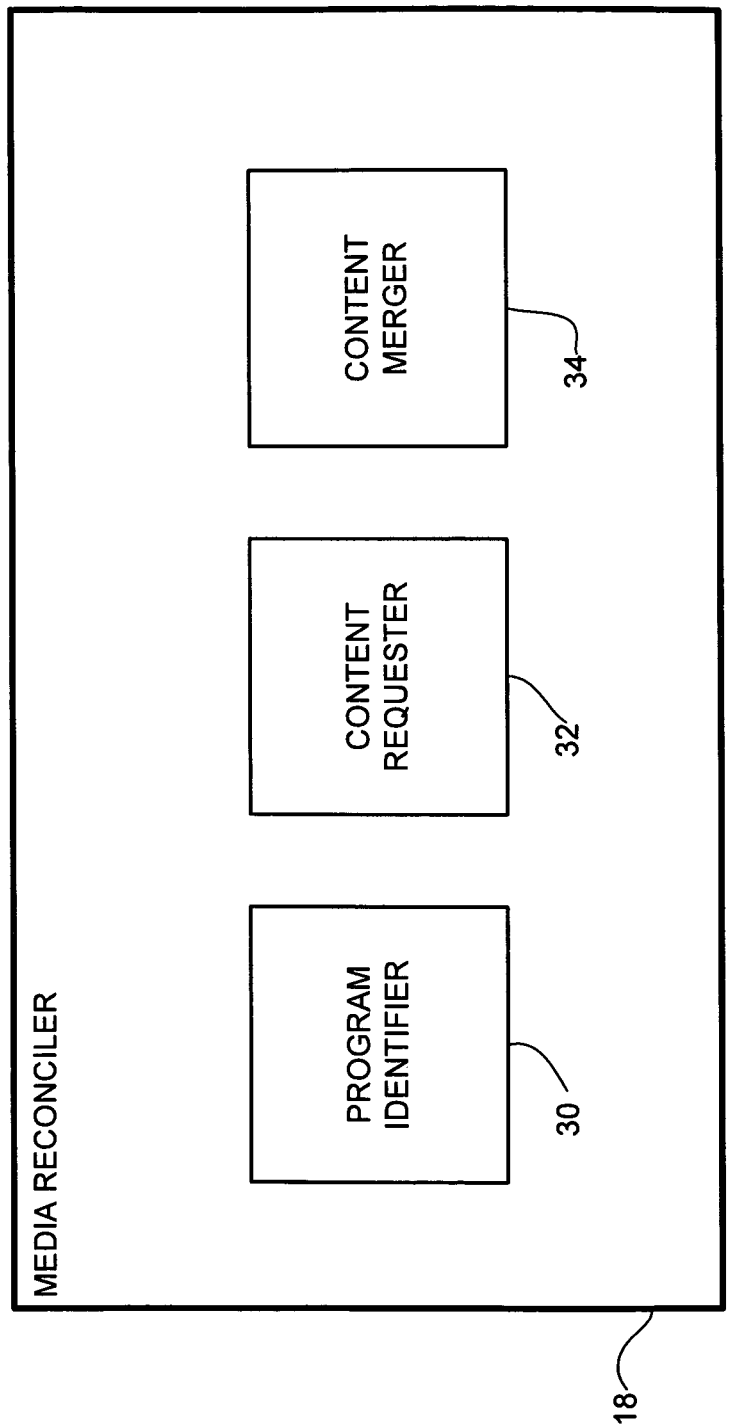
FIG. 3 illustrates an example of a media reconciler of the digital media device of FIG. 2.

FIG. 3 is a block diagram illustrating components of the media reconciler 18, in accordance with one embodiment. The media reconciler 18 includes a program identifier 30, content requester 32, and content merger 34. Each of these functions may be implemented in hardware, software, or any combination thereof. The function of these components is described below with respect to the flow diagram shown in FIG. 4.

Figure 4:
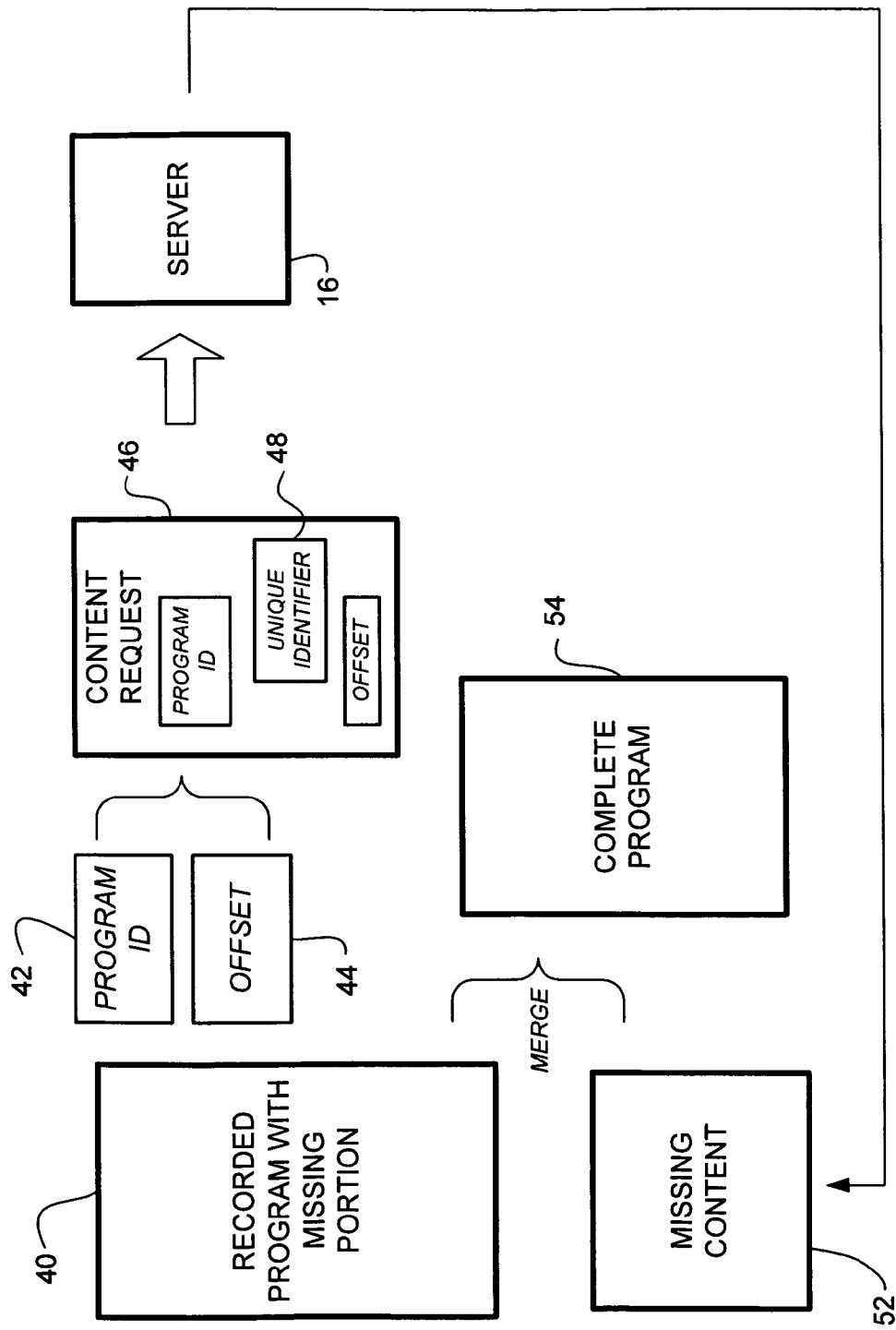
FIG. 4 is a flow diagram illustrating a content request and merge of requested content with recorded content, in accordance with one embodiment.

The program identifier 30 checks a recording 40 of a program to determine if the program started before the recording was initiated (FIGS. 3 and 4). The program may be, for example, a television program (e.g., TV show, movie, sporting event, news broadcast, concert, etc.), audio program (music, talk show, etc.), webcast, or any other media content that has a specified start time. The program identifier 30 may check the recorded program 40 to determine if there is missing content as soon as the recording is started, wait for a period of time after the start of the recording but before the program has ended, or wait until the program has finished. The program identifier 30 may utilize meta-data associated with the program to determine if any time delta exists between the start of the recording and the start of the selected program. The program data may be available from an electronic program guide, for example. If it is determined that the recording started after the start of the program and the missed content is not available at the digital media device 10, the program identifier 30 identifies the program with a program ID 42 and determines an offset 44 between the scheduled (or actual) start of the program and the beginning of the recorded program 40.

The program ID 42 identifies the recorded program 40 that the user is recording. The program ID 42 may be an identifier stored in the electronic program guide and associated with the recorded program. For example, meta-data provided by a service provider typically includes a program ID. The program ID 42 may be a program identifier available at the digital media device and consistent with a program identifier used by the media source 12 or server 16. If the program ID 42 available at the digital media device 10 is not consistent with an ID used by the media source 12 or server 16, the program ID may specify a time and channel to which the tuner is set, to identify the program being recorded.

Figure 5:
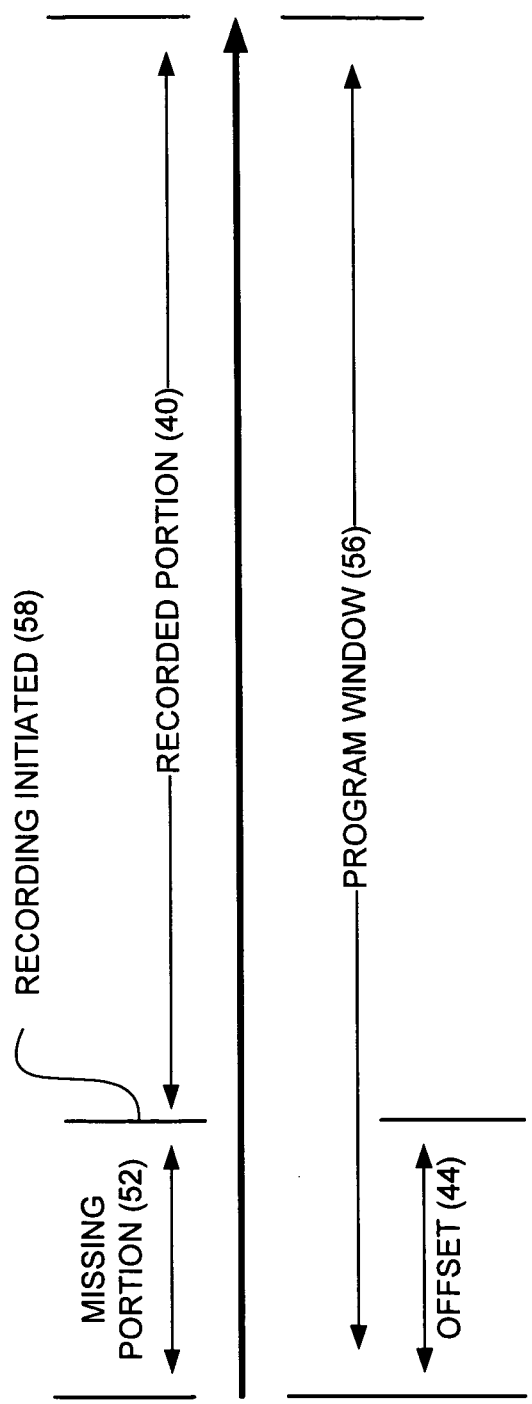
FIG. 5 is a timeline illustrating a period of missed content and recorded content in a program window.

The offset 44 identifies the delta between the start of the program and the point at which the digital media device initiates the recording process (FIGS. 4 and 5). The offset 44 may be a specified time (e.g., the time at which recording started, or amount of minutes or seconds between program start time and recording start time), percentage of program missed, or any other indicator of the fragment of the program content that is needed to complete the program. If time is used to identify the offset, clocks at the digital media device 10 and service provider are preferably synchronized. For example, the digital media device 10 and service provider's network (e.g., media source 12 or CDN node 16) may utilize a synchronized clock to ensure consistency of services.

The program identifier 30 transmits the program ID 42 and offset 44 to the content requester 32, which generates a content request 46 (FIGS. 3 and 4). In one embodiment, the content request 46 includes the program ID 42, offset 44, and a unique identifier 48, which tags the request as a content reconciliation request. The unique identifier allows for the server 16 (or other authorizer or authenticator) to verify the request, if any policy is in place which restricts the asset 40 from being reconciled, as described below.

The content requester 32 transmits the content request 46 to the server 16. Content 52 transmitted to the digital media device in response to the request 46, contains only the missing portion of the program to preserve network bandwidth. Missing content 52 is transferred (downloaded) to the digital media device 10 from the server 16. In one embodiment, the content 52 is delivered to the digital media device 10 as a non-streaming media file. The media file is sent to the digital media device 10 with the original encoding captured within a fixed object. The file may be provided, for example, via HTTP (Hypertext Transfer Protocol), HTTPS (HTTP Secure), FTP (File Transfer Protocol), CIFS (Common Internet File System), or any other protocol.

The content merger 34 is responsible for merging the content 52 received from the server 16 with the content 40, which has already been recorded, to create a contiguous and complete recording. If the missing content 52 is received before the program is finished, the content merger 34 may wait to merge the missing content with the recorded program 40. The content merger 34 may also attach the received content 52 to the beginning of the recorded program 40 while the program is still being recorded. The missing content 52 is preferably provided to the digital media device 10 in the same format as the original content 40 so that there is no need for transcoding the received content to match the original content. Since the media content available at the server 16 was received in the same format that the media source 12 delivered the original program, the content should already be in the proper format, including encode rate. The content merger 34 may comprise, for example, an MPEG-2 merger, joiner application, or other means for creating a contiguous recording from the originally recorded portion of the program 40 and the received missing content 52.

FIG. 5 is a timeline illustrating a period of missed content 52 and recorded content 40 in a program window 56. The program window 56 shows the scheduled start and end times for transmittal of the program from the media source 12. Recording of the program at the digital media device 10 is initiated after start of the program, as indicated at 58. The missing content 52 is the content that was transmitted between the start of the program and the start of the recording. The recorded program 40 is the content stored on the digital media device 10. Depending on the time elapsed within the program window 56, the recorded program 40 may not yet contain an end portion of the program. However, since the program is still being transmitted and recorded, this is not considered to be missing content.

The embodiments may be used with a policy system that allows or denies reconciliation for specific users or content. For example, a service provider or content provider may limit or deny access to content for requests for reconciliation. The service or content provider may also provide a reconciliation service for an increased fee.

Figure 6:
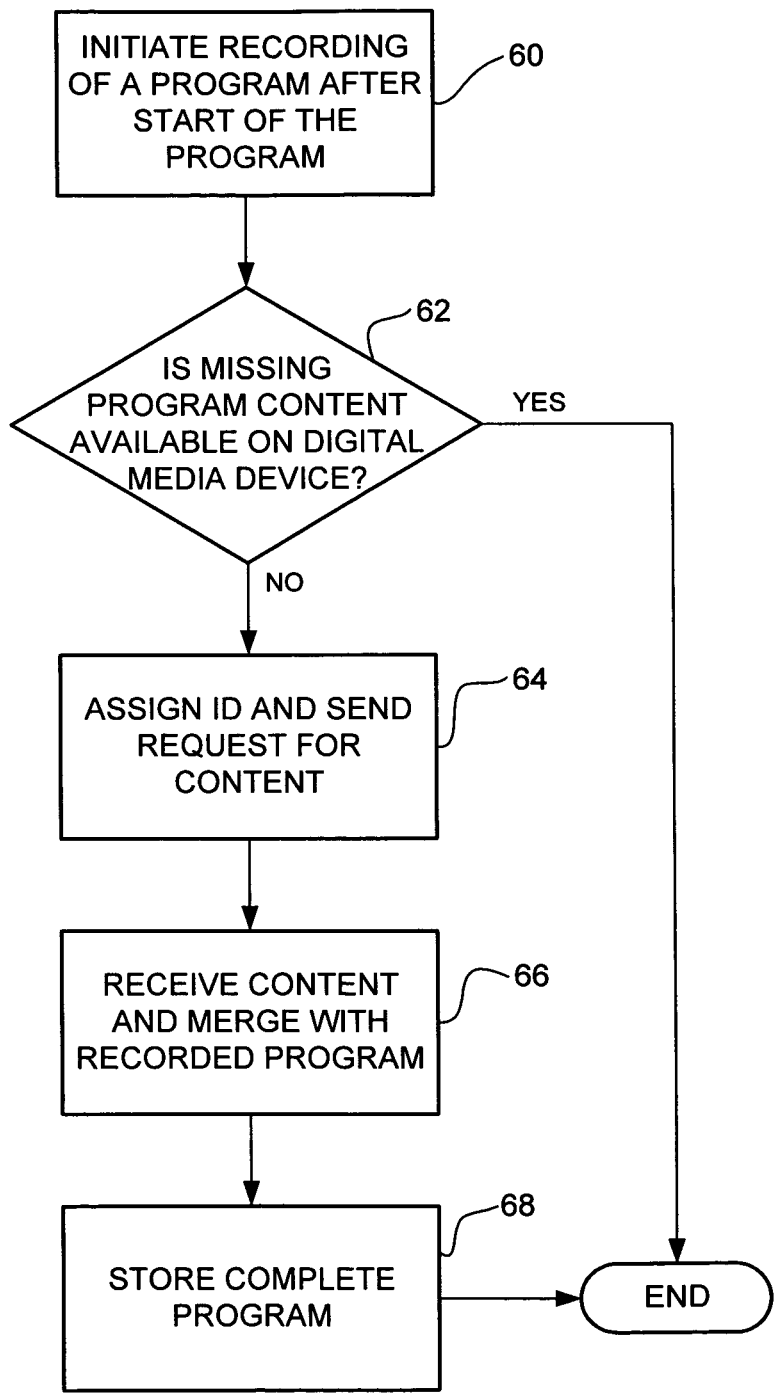
FIG. 6 is a flowchart illustrating an overview of a process for reconciling digital content at the digital media device, in accordance with one embodiment.

FIG. 6 is a flowchart illustrating an overview of a process for reconciling digital content at the digital media device 10, in accordance with one embodiment. At step 60, the digital media device 10 initiates recording a program after the start time of the program. The digital media device 10 may initiate the recording in response to a request received from a user (e.g., input from a remote control or button on digital media device). If the tuner was already tuned to the station before the user requested the recording, the earlier portion of the program may already have been recorded by the DVR, in which case there is no need to request missing content (step 62). If the missing content is not available at the digital media device 10, the device assigns an identifier identifying the program and the content that is missing and transmits a request for the missing content (step 64). The request may be sent while the program is still in progress or after the program is over. As described above, the request for content may be transmitted to a node in a content delivery network, start over server, or other media source. The digital media device 10 receives a media file containing the missing content and merges the received content with the original recording (step 66). The digital media device stores the complete program (step 68).

It is to be understood that the process described above and shown in FIG. 6 is only an example and that steps may be removed, added, combined, or reordered, without departing from the scope of the embodiments.

Although the method and apparatus have been described in accordance with the embodiments shown, one of ordinary skill in the art will readily recognize that there could be variations made without departing from the scope of the embodiments. Accordingly, it is intended that all matter contained in the above description and shown in the accompanying drawings shall be interpreted as illustrative and not in a limiting sense.

What is claimed is:

1. A method comprising:

receiving a request to record a program;

initiating recording of the program at a digital media device;

upon initiating said recording, automatically determining at the digital media device that the program started before the recording was initiated;

identifying at the digital media device, a missing portion of the program;

generating and transmitting a request for said missing portion of the program, said request identifying said request as a reconciliation request; and receiving a media file containing said missing portion of the program in response to said request and merging said missing portion with a recorded portion of the program only if said reconciliation request is allowed based on a policy in place at a content source;

wherein the recorded portion and said missing portion of the program are encoded according to the same encoding format.

2. The method of claim 1 wherein generating said request comprises inserting a program identifier and an offset identifying said missing portion of the program into said request.

3. The method of claim 2 wherein said offset comprises a time period between a start of the program and the initiating recording.

4. The method of claim 2 wherein the program identifier comprises a time and channel to which a tuner is set, to identify the program being recorded.

5. The method of claim 2 wherein the offset identifies a delta between a start of the program and a point at which the digital media device initiated the recording.

6. The method of claim 1 wherein transmitting said request comprises transmitting said request to a network cache in a content delivery network.

7. The method of claim 1 wherein transmitting said request comprises transmitting said request to a server configured for storing a media stream and transmitting a portion of stored media in said media file in response to said request.

8. The method of claim 1 wherein identifying a missing portion of the program comprises utilizing meta-data associated with the program to identify a time difference between initiation of the recording and a start of the program.

9. An apparatus comprising:
a digital video recorder operable to initiate recording a program;
a program identifier for automatically determining that the program started before the recording was initiated upon the digital video recorder initiating the recording and identifying a missing portion of the program;
a content requester for generating and transmitting a request for said missing portion of the program, said request identifying said request as a reconciliation request; and
a content merger for receiving a media file containing said missing portion of the program and merging said missing portion with a recorded portion of the program only if said reconciliation request is allowed based on a policy in place at a content source; and
memory for storing the merged missing portion and recorded portion of the program;
wherein the recorded portion and said missing portion of the program are encoded according to the same encoding format.

10. The apparatus of claim 9 wherein said request comprises a program identifier and an offset identifying said missing portion of the program.

11. The apparatus of claim 10 wherein said offset comprises a time period between a start of the program and the initiating recording.

12. The apparatus of claim 9 wherein said request is configured for transmittal to a network cache in a content delivery network.

13. The apparatus of claim 9 wherein said request is configured for transmittal to a server configured for storing a media stream and transmitting a portion of stored media in said media file in response to said request.

14. The apparatus of claim 9 wherein the media file comprises a non-streaming media file.

15. The apparatus of claim 9 wherein said request comprises a unique identifier that tags said request as said content reconciliation request.

16. The apparatus of claim 9 wherein the content merger is configured to attach said missing portion to a beginning of the recorded program while the program is being recorded.

17. Logic encoded in one or more non-transitory tangible media for execution and when executed operable to:
initiate recording a program upon receiving a request to record the program;
upon initiating said recording, automatically determine that the program started before the recording was initiated;
identify a missing portion of the program;
generate and transmit a request for said missing portion of the program, said request identifying said request as a reconciliation request;
merge a received media file containing said missing portion with a recorded portion of the program only if said reconciliation request is allowed based on a policy in place at a content source; and
store the merged missing portion and recorded portion of the program at the digital media device;
wherein the recorded portion and said missing portion of the program are encoded according to the same encoding format.

18. The logic of claim 17 wherein the logic for generating said request comprises logic for inserting a program identifier and an offset identifying said missing portion of the program into said request.

* * * * *